May 8, 1956 H. A. MOELLER 2,744,471
EQUALIZED RAILWAY TRUCK
Filed Feb. 7, 1952 2 Sheets-Sheet 1
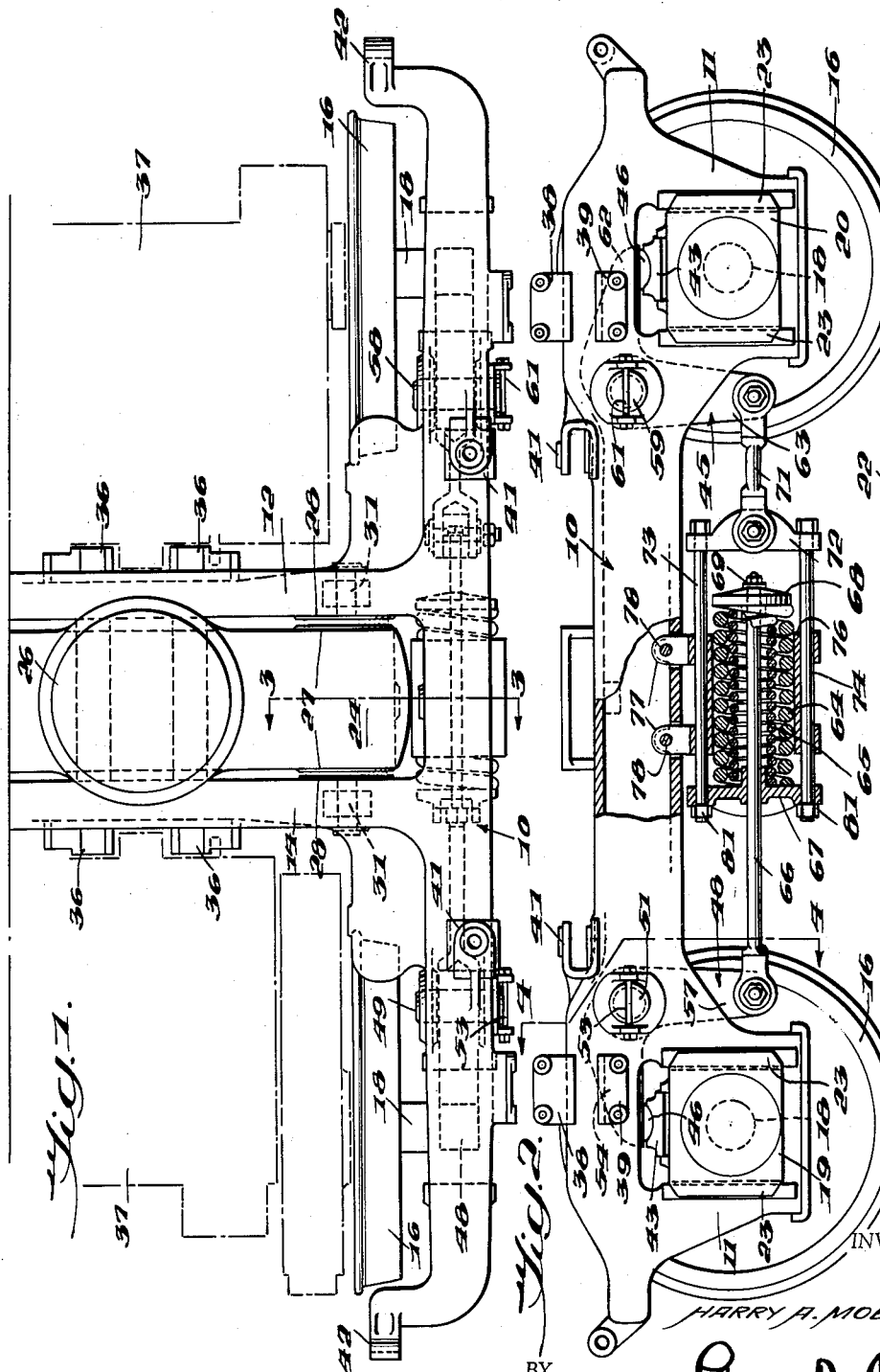
INVENTOR
HARRY A. MOELLER,
BY
ATTORNEY May 8, 1956 H. A. MOELLER 2,744,471
EQUALIZED RAILWAY TRUCK
Filed Feb. 7, 1952 2 Sheets-Sheet 2

INVENTOR
HARRY A. MOELLER,
BY
ATTORNEY

United States Patent Office 2,744,471
Patented May 8, 1956

2,744,471

EQUALIZED RAILWAY TRUCK

Harry A. Moeller, Columbus, Ohio, assignor to The Buckeye Steel Castings Company, Columbus, Ohio Application February 7, 1952, Serial No. 270,316

7 Claims. (Cl. 105—194)

The present invention relates to a railway vehicle truck of the rigid frame type which, nevertheless, provides for positive equalization so that the loads imposed on the journals at each side of the truck are always equal regardless of track irregularities or the amount of spring compression. The invention further pertains to a railway vehicle truck embodying damping of the oscillations of the load supporting springs.

In earlier railway trucks provided with a rigid frame "equalizer bars" have been employed and other means have been resorted to in efforts to apply the load more equally to journals of the truck. Such equalizer bars afford little equalization of the journal loads so that there is an overload at one journal and an underload at another. Such overloading at some portions of the truck structure induces high axle stresses tending to produce axle failures as well as high wheel loads which are damaging to the rails and wheels particularly when large axle capacities are involved and heavy loads are imposed on the truck. The lack of proper equalization of the load on the respective wheels provide higher bending moments in the truck frame requiring excessively large sections of metal to resist such strains resulting in uneconomical use of metal or failure of the truck frames.

It is accordingly an object of the present invention to provide a rigid frame railway truck embodying therein positive equalization of the load imposed on the bolster so that the loads on the journals at each side of the truck are always equal regardless of track irregularities or the extent of compression of the load supporting springs and to provide a truck for a railway vehicle wherein the wheel loads at an end of the vehicle body will remain equal during acceleration of the body as a result of the application of a propelling or braking force which shifts the center of the vertical load longitudinally of the truck and displaces the point of application of the vertical load from the geometrical center of the center plate of the truck bolster.

A further object of the invention is to provide at least one spring at each side of the truck and particularly coil springs of long travel type to improve the ride characteristics of the truck and to arrange the springs in a horizontal manner so that springs of the long travel type may be readily accommodated in the truck without unduly extending the height dimensions of the truck.

It is known that a reduction of the spring constant of load per unit deflection leads to the provision of an easy riding vehicle. The ideal spring is one that is infinitely long and compressed to within a few inches of its solid condition by the loaded vehicle. In a vehicle equipped with such springs there is no noticeable vertical acceleration of the vehicle body due to irregularities in the road bed during compression of the springs as a result of such irregularities and such a spring suspension provides an evenly riding vehicle. The ideal spring arrangement is impossible in practice and it has been customary to provide in the limited vertical space available in railway trucks a group of coil springs and leaf springs in series to build up the amount of spring travel in order to lower the load per unit deflection. The present invention takes advantage of the larger horizontal space available in a railway truck for accommodating springs of longer dimensions than would be possible in the vertical space available under practical restrictions and such horizontal disposition of the springs in combination with the equalizing mechanism which forms a part of the invention permits springs of longer travel and lower capacity than is possible with known spring arrangements thereby reducing materially the load per unit deflection constant and approaching more closely the ideal spring suspension.

Another object of the invention is to provide a truck in which the coil spring arrangement for supporting the load imposed on the vehicle is arranged in association with an equalizing mechanism so arranged that the spring supporting assembly and the equalizing mechanism serve as a damping arrangement for the load supporting springs.

A still further object of the invention is to provide a spring supporting assembly for a railway vehicle in which approximately only one-half of the spring capacity as measured by the load necessary to compress the springs from a free to a solid condition is required to resiliently support the vehicle load on the truck as compared with the conventional vertically arranged springs.

A further object of the invention is to provide a "knee action" spring suspension assembly in a railway vehicle truck including means providing for positive equalization of the load imposed on the truck so as to distribute such load equally to the wheel journals and to provide a spring suspension system embodying self-damping and a low load per unit deflection of the springs whereby improved ride characteristics are obtained.

Another object of the invention is to reduce the unsprung weight of a railway vehicle truck to a minimum by the elimination of unsprung "equalizer bars" and at the same time provide more positive and uniform distribution of the load imposed on the truck to all of the wheel journals.

Another object of the invention is to provide a railway truck in which lateral motion of the bolster is permitted and to provide a spring suspension arrangement for the bolster wherein the springs are of the long travel type and at the same time avoiding the necessity of resorting to bolster supporting springs suspended from the lateral motion hangers to thereby eliminate crabbing of the bolster and truck frame at the chafing plates which results from an eccentric movement of the bolster relative to the truck frame when flexible springs are employed in association with the hangers.

Other objects and features of the invention will be more apparent to those skilled in the railway art as the present disclosure proceeds and upon consideration of the accompanying drawings and the following detailed description wherein several exemplary embodiments of the invention are disclosed.

In the drawings:

Fig. 1 is a plan view showing a longitudinal half of a railway truck exhibiting the invention.

Fig. 2 is a side elevational view partly in section.

Figure 6:
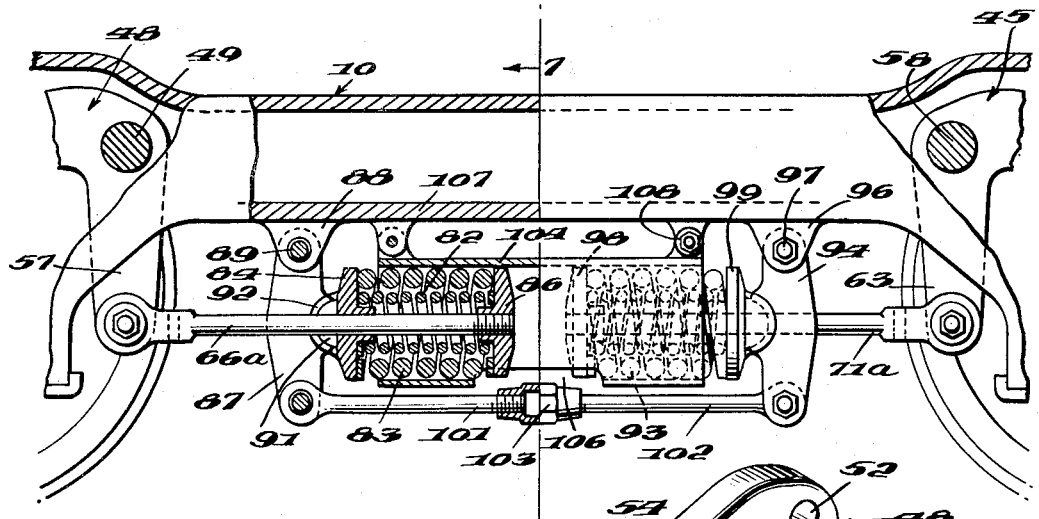
Fig. 6 is a side elevational view partly in section showing a modified arrangement of the load supporting springs.

A railway truck exhibiting the invention has particular utility in locomotives of the diesel type and is designed for mounting of the electric driving motors in association with the truck axles. The truck is equally useful for electric locomotives or locomotives of the gas or steam turbine types in that space is provided for accommodation of the electric motors on the axles of the truck. The truck forming the subject-matter of the present invention is not limited in its use to locomotives and may be employed as the bogie in other railway vehicles, such as freight and passenger cars.

Referring to the drawings there is shown at 10 a side frame member which is arranged longitudinally of the truck at one side thereof. This side frame member carries spaced journal pedestals 11 which are formed integral with the frame member 10 and thus remain in fixed spaced relationship. The frame includes transverse transom members 12 and 14 which extend laterally from one side frame member 10 and are rigidly connected to a side frame member (not shown) at the other side of the truck. The transom members 12 and 14 which extend across the truck are spaced from each other longitudinally of the truck as shown in Fig. 1. In the embodiment illustrated the truck is of a four wheel type and two of the wheels at one side of the truck are shown at 16. The wheels are mounted on axles 18 and the wheel journals are accommodated in journal boxes 19 and 20. The wheels 16 ride on a railway rail diagrammatically indicated at 22. The pedestals 11 are shaped to provide jaws for receiving the journal boxes 19 and 20 and maintain the axle assemblies in fixed spaced relationship longitudinally of the truck. Each journal box is provided with guide flanges 23 which overlie opposite lateral portions of the pedestal jaws as shown in Fig. 2. The guide flanges 23 at each side of each journal box are horizontally spaced from each other so as to permit limited lateral movement of the journal box and the axle relative to the frame. The journal boxes 19 and 20 may move upwardly and downwardly in the pedestal jaws and accordingly the truck frame and the axles are free for relative vertical movements.

Figures 3, 5:
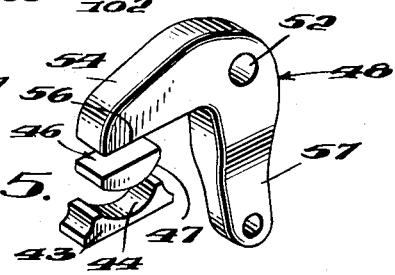
Fig. 3 is a fragmentary sectional view taken on the line 3—3 of Fig. 1.
Fig. 5 is an exploded perspective view of one of the bell crank levers and associated bearing blocks.

A bolster for the truck is shown at 24 provided with the usual center plate 26 for supporting a railway vehicle body (not shown) in a conventional manner. The bolster 24 is arranged transversely of the truck and positioned between the transom members 12 and 14. Chafing plates 27 are provided on the lateral faces of the bolster and additional chafing plates 28 are carried by the confronting sides of the transom members 12 and 14 as shown in Fig. 1. The bolster 24 is supported on the side frame 10 by means of U-shaped hangers 29 one of which is shown in Fig. 3. The hanger 29 is inclined to the vertical and slopes outboard of the truck in proceeding downwardly from its upper ends so as to permit limited lateral motion of the bolster for relieving lateral thrusts and impacts on the rail and the vehicle super-structure when rounding curves in the road bed or negotiating cross-overs or the like in the track. Pins 31 connect the upper ends of the hanger 29 to the transom members 12 and 14. The upper edge portion 32 of the swing hanger 29 is of convex shape as shown in Fig. 3 which engages a concave surface in a bearing block 33. The bearing block 33 is secured to bracket 30 which extends downwardly from the bolster 24. The arcuate surface 32 and the curved surface in the bearing member 33 are for the purpose of permitting lateral movements of the bolster relative to the side frame members. Such lateral movements of the bolster are restrained and a self-centering action is developed because the inclination of the hangers tends to return the bolster to a central position and the bolster must slightly rise to lift the weight of the vehicle when there is tendency of the bolster to move laterally. It will be noted that springs are not interposed in the usual manner between the bolster and the hanger seat thus eliminating the requirement for a transverse spring plank usually employed when the bolster is spring supported on the hangers. Since there is an absence of springs resiliently and flexibly supporting the bolster there is no crabbing of the bolster 24 at the chafing plates 27 and 28.

Adequate space is provided for accommodateing the driving motors when the truck is to be used in a locomotive of the electric drive type. The driving motors shown in phantom lines at 37 are mounted on the axles 18 and portions are supported on lugs 36 carried by the transom members 12 and 14. The truck is adaptable for conventional type clasp brakes and brackets 38 and 39 are provided for attaching brake cylinders to the side frame member 10. Brackets 41 carried by the frame serve as fulcrums for the brake levers (not shown). The side frame may also carry brackets 42 at the opposite ends which serves as brake hanger and lever supports. It will be appreciated that the motors 37 and the driving gears therefor will be omitted when the truck is used for railway cars.

The load imposed on the center plate 26 of the bolster is transferred to the frame and to the side frames at opposite sides of the truck. This load is imposed on the journals for the wheels by means of a spring suspension system which provides positive equalization of the load on the journal boxes at each side of the truck. A bearing block 43 is mounted on the top of each journal box 19 and 20. Each bearing block 43 is provided with an arcuate and concave surface 44 as shown in Fig. 5. A bearing element 46 is arranged above each of the bearing blocks 43 as illustrated in Fig. 2. A convex surface 47 on the bearing element 46 engages the concave surface 44 so as to permit relative rocking movement of the bearing element 46 with respect to the bearing block 43. A bell crank lever 48 is mounted within the frame 10 and adapted to rotate about a pin 49 having a relatively large diameter. The pin 49 is provided with a head 51 and the pin 49 extends through horizontally aligned openings in the depending side walls 40 and 50 of the side frame member 10. The pin 49 extends through an opening 52 (Fig. 5) in the bell crank lever 48. A bolt 53 is arranged transversely of the head 51 of the pin to maintain it in an operative position. A horizontal arm 54 of the bell crank lever 48 has a straight under surface 56 adapted to be engaged by the flat straight upper surface of the bearing element 46 (Fig. 5). A vertically disposed arm 57 of the bell crank lever 48 extends downwardly between the inboard and outboard walls of the side frame member and projects therebelow as shown in Fig. 2. A similar shaped bell crank lever 45 is provided adjacent the journal box 20 and is adapted to turn around a pivot pin 58. The head of the pin 58 is shown at 59 and this pin is retained in place by means of a bolt 61. A horizontal arm 62 of the bell crank lever 45 has a flat under surface for engaging the straight upper surface of the associated bearing element 46. The bell crank lever 45 includes a vertically disposed arm 63 which depends between the inboard and outboard side walls of the frame 10 to a position therebelow as shown in Fig. 2.

A long travel horizontally disposed spring assembly is arranged below an intermediate portion of the side frame member 10 which is box-shaped in section in this area. The long travel spring unit may include a nest of coil springs as represented by one helical spring 64 and a second helical spring 65 arranged within the spring 64. A rod 66 is pivotally connected to the lower end 57 of the bell crank lever 48 and extends through a yoke member 67 and through the hollow axis of the nest of springs. A cap member 68 is attached to the free end of the rod 66 in any suitable manner such as by means of a nut 69. A rod 71 is pivotally connected to the lower end 63 of the bell crank lever 45 and also pivotally connected to a yoke member 72. An elongated bolt 73 connects the upper end of the yoke member 72 to the upper end of the yoke member 67. An elongated bolt 74 connects the lower end of the yoke member 72 to the lower end of the yoke member 67.

An open-ended cylindrical shaped guard member 76 is provided embracing a portion of the spring assembly to prevent loss of the springs in case of spring breakage. Lugs 77 are carried by the upper portion of the guard member 76. These lugs 77 extend through openings in the bottom web of the side frame member 10. Pins or bolts 78 are provided for attaching the lugs 77 to the frame. The guard member 76 is provided with openings for accommodating the bolts 73 and 74 while permitting longitudinal movement of the bolts relative to the guard member. The guard member 76 also serves to support the mass of the spring assembly which although taut when the truck is under load may have a tendency to oscillate vertically.

The load applied to the center plate 26 of the bolster 24 is imposed on the intermediate portion of opposite side frame members 10. The side frame member 10 moves downwardly and the pedestal jaws move downwardly relative to the journal boxes 19 and 20. The arm 54 of the bell crank lever 48 is accordingly moved upwardly and this bell crank lever rotates in a clockwise direction about the axis of the pin 49. The horizontal arm 54 then assumes a slightly different angular position but such movement is permitted and accommodated by the arcuate surfaces 44 and 47 of the bearing blocks. The lower end 57 of the vertical arm of the bell crank lever 48 thus moves to the left in Fig. 2 to pull the rod 66 to the left and apply force against the right hand end of the spring assembly comprising the springs 64 and 65. Such downward movement of the frame will also develop an upward movement of the journal box 20 relative to its pedestal jaws. The horizontal arm 62 of the bell crank lever 45 will be moved upwardly to rotate this bell crank lever in a counterclockwise direction about the axis of the pin 58. Such movement is permitted by the arcuate bearing surfaces between the bearing block 43 and the bearing element 46. The lower end 63 of the vertically disposed arm of the bell crank lever 45 is thus moved to the right in Fig. 2 to pull the rod 71 to the right. The yoke member 72 thus applies tension to the bolts 73 and 74 and the yoke member 67 is moved to the right. The springs 64 and 65 are thereby compressed between the cap member 68 and the yoke member 67.

The spring assembly and the yoke arrangement is free to shift longitudinally of the truck. The bell crank levers 45 and 48 are desirably of identical design and construction so that four bell crank levers of the same type are all that are needed in a four-wheel car truck. The loads imposed on the horizontal arms of the bell crank levers and on the journals are always equal because the forces imposed by the compressed spring 64 and 65 at the lower ends of the bell crank levers cannot be unequal. Any tendency of inequality of the vertical load that may develop as a result of track irregularities is equalized by the spring assembly and the bell crank lever organization.

Another advantageous feature of the suspension system is that the capacity of the springs at each side of the truck need only be sufficient for one journal load instead of two journal loads as is customary and necessary in trucks provided with vertically arranged load supporting springs. The horizontal disposition of the load springs as herein described and the reduction of the capacity of the springs at each side of the truck provides an arrangement wherein the desirable feature of springs designed for low load per unit deflection may be utilized to insure good riding characteristics. The relatively large space for the horizontally disposed springs makes it possible to use a single coil or two coil springs as shown at 64 and 65. Springs having from ten to fifteen inches total travel can be used in such a horizontally disposed manner. The springs thus have a low load per unit deflection characteristic and when there are individual wheel disturbances due to track irregularities there is no noticeable vertical acceleration of the vehicle body due to irregularities in the road bed. It will be further noted that when a vehicle body supported on the truck is acted upon by horizontal force such as centrifugal force developed when the vehicle is negotiating curves in the track the springs perform more in parallel reducing the rotation of the vehicle body but still providing a low rate of the load per unit deflection.

The suspension arrangement provides for snubbing of any oscillations of the load supporting springs. The bell crank levers 45 and 48 are partially rotated during any deflection of the springs. Frictional moments are thereby developed between the peripheries of the pins 49 and 58 and the respective bell crank levers. These pins are purposely formed of relatively large diameters so as to provide frictional resistance and snubbing or damping of any vibration of the load supporting springs. There is friction between the bearing blocks 43 and the bearing elements 46. The amount of damping may be controlled by alterations in the diameter of the pins 49 and 58. As the diameter of the pins is increased the greater is the friction moment to resist oscillation of the springs. The low load per unit deflection of the load supporting springs provide a spring suspension which requires less damping than that of conventional trucks where such low load per unit deflection of the springs is impossible because of limitations in the space for long travel springs.

The truck does not require shimming as is customary with trucks wherein the load supporting springs are arranged in vertical positions. The level of the center plate 26 of the present truck may be adjusted by taking up or letting out on the nuts 81 of the bolts 73 and 74 or adjusting the position of the cap member 68 on the rod 66. In order to raise the center plate 26 due to wear such as worn wheels or any permanent sets in the springs these nuts are tightened. In order to lower the position of the center plate 26 the nuts 69 and 81 may be loosened. It will be further noted that any unequal wear of the wheels resulting in changes in diameter of some of the wheels of the truck does not disturb equalization of the load on the journals.

A railway locomotive or car equipped with trucks of the type herein disclosed provides an organization wherein the body structure is supported on the center plates of the bolsters and the trucks may swivel with respect to the vehicle body in a conventional manner. The vehicle body in use in railway operations is subjected to acceleration as a result of a propelling or braking force. Either of such a force acts longitudinally and horizontally of the vehicle and develops a torque causing a slight rotation of the frame members which is permitted by the equalizing system. Such rotation of the frame members results in a shifting of the point of application of the vertical load from the geometrical center of the center plate. The bell crank levers assume different positions and the suspension system equalizes the loads on the front and rear axles of the truck during acceleration of the car body.

Figures 4, 7:
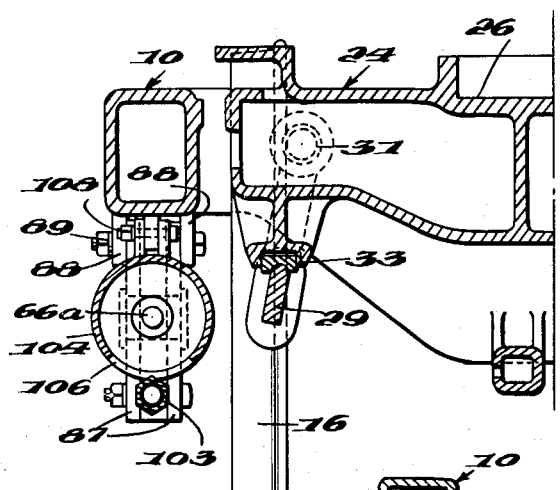
Fig. 4 is a sectional view on a reduced scale taken on the line 4—4 of Fig. 2.
Fig. 7 is a sectional view taken on the line 7—7 of Fig. 6.

A modification of the spring assembly is shown in Figs. 6 and 7. In this embodiment two spring groups are used at each side of the truck. A helical spring 82 is arranged within another helical spring 83 as shown in Fig. 6. A rod 66a is pivotally connected to the lower end 57 of the bell crank lever 48 and extends in a slidable relationship through a disc 84. The free end of the rod 66a is connected to a cap member 86 by means of threads or the like. A pair of levers 87 are pivotally connected at their upper ends to lugs 88 carried by the lower web of the side frame member 10 by means of a bolt 89. The disc 84 is provided with an arcuate bearing member 91 which engages in concave sockets 92 formed in the intermediate parts of the vertically disposed levers 87.

A similar second nest of springs is provided at the same side of the truck and represented generally at 93 in Fig. 6. The pull rod 71a is pivotally connected to the lower end 63 of the bell crank lever 45. This rod 71a extends between two vertically disposed levers 94 which are pivotally attached at their upper ends to lugs 96 by means of a bolt 97. A cap member 98 is connected to the free end of the pull rod 71a and a disc 99 engages the ends of the nest of springs 93. The lower ends of the levers 87 and the lower ends of the levers 94 are connected by a tension member which comprises two rods 101 and 102 pivotally connected at their outer ends to the vertical levers. The adjacent ends of the rods 101 and 102 are connected to each other by a turnbuckle connecting member 103. The turnbuckle is provided with oppositely arranged threads for adjusting the length of the tension member and accordingly the elevation of the center plate 26 of the bolster 24. In this embodiment the force applied to the pull rods is always uniform and hence loads are equal in all conditions of track irregularities.

The two groups of springs at each side of the truck may be partially encased in a guard housing 104. The housing 104 is generally cylindrical shaped and provided with open ends. The housing has an opening 106 to permit assembly of the springs and associated parts. The guard housing is attached to the bottom web 107 of the side frame member 10 by means of lugs and bolts 108. The housing 104 prevents loss of the springs in case of breakage and prevents vertical oscillation of the springs.

While the invention has been described with reference to specific structural features and with regard to an assembly for transmitting the vehicle load to horizontally disposed springs it will be appreciated that changes may be made in the details as well as the general organization. Such modifications and others may be made without departing from the spirit and scope of the invention as set forth in the appended claims.

What I claim and desire to secure by Letters Patent is:

1. In a railway car truck, wheel and axle assemblies spaced longitudinally of said truck, a journal box for each axle assembly, a side frame member arranged longitudinally of the truck movable upwardly and downwardly relative to said journal boxes, said side frame member having transversely spaced side walls connected by a top plate, journal pedestals carried by the side frame member maintaining said journal boxes in said spaced relationship during relative vertical movements of the side frame member with respect to said journal boxes, a bolster arranged transversely of the truck, a center plate on the bolster, means transmitting a load imposed on the center plate onto an intermediate portion of the side frame member, a bell crank lever having its major portion between said side walls with a depending arm extending therebelow, another arm on the bell crank lever overlying one journal box, a pin extending through both of said side walls supporting an intermediate portion of the bell crank lever for rotation relative to the side frame member, a second bell crank lever having its major portion between said side walls with a depending arm extending therebelow, another arm on the second bell crank lever overlying the other journal box, a pin extending through both of said side walls supporting an intermediate portion of the second bell crank lever for rotation relative to the side frame member, horizontally disposed coil spring means arranged under an intermediate portion of said side frame member connected to said depending arms opposing movements of the depending arms away from each other, a cylindrical shaped member embracing said spring means, a bottom web at the intermediate portion of the side frame member connecting said side walls, and lugs attached to the side frame member adjacent said bottom web supporting said cylindrical shaped member.

2. In a railway car truck, wheel and axle assemblies spaced longitudinally of said truck, a journal box for each axle assembly, a side frame member arranged longitudinally of the truck movable upwardly and downwardly relative to said journal boxes, journal pedestals carried by the side frame member maintaining said journal boxes in said spaced relationship during relative vertical movements of the side frame member with respect to said journal boxes, a bolster arranged transversely of the truck, a center plate on said bolster, means transmitting a load imposed on the center plate from one end of the bolster onto an intermediate portion of the side frame member a bell crank lever having a depending arm, a bearing block having an arcuate surface mounted on the top of one journal box, a bearing element having an arcuate surface complementary to and engaging said arcuate surface, another arm on the bell crank lever engaging said bearing element, means supporting an intermediate portion of the bell crank lever for rotation relative to the side frame member, a second bell crank lever having a depending arm, a bearing block having an arcuate surface mounted on the top of the other journal box, a bearing element having an arcuate surface complementary to and engaging the arcuate surface of the second bearing block, another arm on the second bell crank lever engaging the second bearing element, means supporting an intermediate portion of the second bell crank lever for rotation relative to the side frame member, and resilient means under an intermediate portion of the side frame member opposing movements of the depending arms from each other.

3. In a railway car truck, wheel and axle assemblies spaced longitudinally of said truck, a journal box for each axle assembly, a side frame member arranged longitudinally of the truck movable upwardly and downwardly relative to said journal boxes, journal pedestals carried by the side frame member maintaining said journal boxes in said spaced relationship during relative vertical movements of the side frame member with respect to said journal boxes, a bolster arranged transversely of the truck, a center plate on said bolster, means transmitting a load imposed on the bolster center plate onto an intermediate portion of said side frame, a lever pivotally mounted on said side frame member having an arm overlying one journal box and a depending arm, a lever pivotally mounted on said side frame member having an arm overlying the other journal box and a depending arm, coil spring means horizontally disposed and arranged lengthwise under an intermediate portion of the side frame member for bodily movements with respect thereto, a rod pivotally connected to one depending arm extending through said spring means, a cap member adjustably mounted on said rod engaging one end of the spring means, a rod pivotally connected to the other depending arm, a yoke member attached to the second rod, a pair of bolts extending from said yoke member along sides of said spring means, a member adjustably mounted on said bolts engaging the other end of the spring means, and means carried by the intermediate portion of the side frame member embracing said spring means.

4. In a railway car truck, wheel and axle assemblies spaced longitudinally of said truck, a journal box for each axle assembly, a side frame member arranged longitudinally of the truck movable upwardly and downwardly relative to said journal boxes, journal pedestals carried by the side frame member maintaining said journal boxes in said spaced relationship during relative vertical movements of the side frame member with respect to said journal boxes, a bolster arranged transversely of the truck, a center plate on said bolster, means transmitting a load imposed on the bolster center plate onto an intermediate portion of said side frame, a lever pivotally mounted on said side frame member having an arm overlying one journal box and a depending arm, a lever pivotally mounted on said side frame member having an arm overlying the other journal box and a depending arm, a coil spring arranged lengthwise under an intermediate portion of the side frame member, a second coil spring in axial alignment with the first spring arranged under an intermediate portion of the side frame member, a rod pivotally connected to one depending arm extending through the first spring, a cap member mounted on said rod engaging one end of the first spring, a second rod pivotally connected to the other depending arm extending through the second spring, a cap member on the second rod engaging one end of the second spring, an abutment engaging another end of the first spring pivotally mounted on the side frame member, an abutment engaging the other end of the second spring pivotally mounted on the side frame member, and an adjustable tension member coupling said abutments.

5. In a railway car truck for supporting an end of a railway vehicle body for swivel relationship therewith the combination comprising, wheel and axle assemblies spaced longitudinally of said truck, a journal box on each axle assembly, a side frame member arranged longitudinally of the truck movable upwardly and downwardly relative to said journal boxes, said side frame member including means maintaining said journal boxes in said spaced relationship during relative vertical movements of the side frame member with respect to said journal boxes, a bolster arranged transversely of the truck, an upward facing center plate carried by the bolster for receiving the load of said end of the railway vehicle body, means transmitting the load at an end of the bolster onto an intermediate portion of the side frame member, horizontally disposed coil spring means arranged longitudinally of said side frame member for equalizing the load on said axles, a lever pivotally mounted on said side frame member having an arm overlying one journal box, means moved by said lever for applying force to one end of said spring means as the associated end of the side frame member moves downwardly relative to its journal box, a second lever pivotally mounted on said side frame member having an arm overlying the other journal box, and means moved by the second lever for applying force to the other end of said spring means as the second end of the side frame member moves downwardly relative to its journal box.

6. In a railway car truck for supporting an end of a railway vehicle body for swivel relationship therewith the combination comprising, wheel and axle assemblies spaced longitudinally of said truck, a journal box on each axle assembly, a side frame member arranged longitudinally of the truck movable upwardly and downwardly relative to said journal boxes, said side frame member including means maintaining the journal boxes in said spaced relationship during relative vertical movements of the side frame member with respect to said journal boxes, a bolster arranged transversely of the truck, a center plate carried by the bolster for receiving the load of said end of the railway vehicle body and accommodating swivelling of the vehicle body with respect to the bolster, means transmitting the load at an end of the bolster onto an intermediate portion of the side frame member, horizontally disposed coil spring means arranged longitudinally of said side frame member and bodily movable with respect thereto for equalizing the load on said axles, a lever pivotally mounted on said side frame member adjacent each end thereof, each lever having an arm overlying one of said journal boxes, and means actuated by said levers for applying force to opposite ends of the spring means as an end of the side frame member moves downwardly relative to its journal box.

7. In a railway car truck, for supporting an end of a vehicle body for swivel relationship therewith the combination of, wheel and axle assemblies spaced longitudinally of said truck, a journal box for each axle assembly, a side frame member arranged longitudinally of the truck movable upwardly and downwardly relative to said journal boxes including side walls, journal pedestals on the side frame member maintaining said journal boxes in said spaced relationship during relative vertical movements of the side frame member with respect to said journal boxes, a bolster arranged transversely of the truck, a center plate on the bolster, means transmitting a load imposed on the bolster center plate onto an intermediate portion of the side frame member, horizontally disposed coil spring means arranged below and lengthwise of an intermediate portion of said side frame member for equalizing the load on said axles, a lever pivotally mounted between said side walls having an arm overlying one journal box and a second arm extending therebelow, means moved by said second arm for applying force to said spring means as the side frame member moves downwardly relative to one journal box, a lever pivotally mounted between said side walls having an arm overlying the other journal box and an arm extending therebelow, and means moved by the last arm for applying force to the spring means as the side frame member moves downwardly relative to the other journal box to compress the spring means and resiliently support the side frame member on said journal boxes.

References Cited in the file of this patent

UNITED STATES PATENTS

| | | |
|---|---|---|
| 1,229,708 | Bravi | June 12, 1917 |
| 1,952,819 | Nyffenegger | Mar. 27, 1934 |
| 2,071,502 | Dalton | Feb. 23, 1937 |
| 2,247,458 | Wintemberg | July 1, 1941 |
| 2,350,567 | Nystrom et al. | June 6, 1944 |